US010411629B2

(12) United States Patent
Lee et al.

(10) Patent No.: US 10,411,629 B2
(45) Date of Patent: Sep. 10, 2019

(54) SYNCHRONOUS MOTOR CONTROL CIRCUIT AND CONTROL METHOD

(71) Applicant: DELTA ELECTRONICS, INC., Taoyuan (TW)

(72) Inventors: Yu-Ling Lee, Taoyuan (TW); Ming-Tsung Chen, Taoyuan (TW); Tung-Chin Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 60 days.

(21) Appl. No.: 15/479,295

(22) Filed: Apr. 5, 2017

(65) Prior Publication Data

US 2018/0109217 A1 Apr. 19, 2018

(30) Foreign Application Priority Data

Oct. 19, 2016 (CN) .......................... 2016 1 0910100

(51) Int. Cl.
*H02P 21/00* (2016.01)

(52) U.S. Cl.
CPC ................................. *H02P 21/0089* (2013.01)

(58) Field of Classification Search
CPC ................................. H02P 21/0089; H02P 6/08
USPC ......................................................... 318/400
See application file for complete search history.

(56) References Cited

U.S. PATENT DOCUMENTS

| | | | |
|---|---|---|---|
| 4,604,563 A * | 8/1986 | Min ........................ | H02P 1/44 318/785 |
| 9,225,270 B2 | 12/2015 | Takahashi | |
| 2005/0140329 A1 * | 6/2005 | Ihm ........................ | H02P 21/06 318/712 |
| 2009/0284195 A1 * | 11/2009 | Gallegos-Lopez ... | B60L 15/025 318/400.02 |
| 2010/0066283 A1 * | 3/2010 | Kitanaka ............... | B60L 15/025 318/400.02 |

(Continued)

FOREIGN PATENT DOCUMENTS

| | | |
|---|---|---|
| CN | 102386816 A | 3/2012 |
| CN | 103701384 B | 4/2016 |
| TW | 200820579 A | 5/2008 |

*Primary Examiner* — Jorge L Carrasquillo
*Assistant Examiner* — Devon A Joseph
(74) *Attorney, Agent, or Firm* — CKC & Partners Co., LLC (57) ABSTRACT

A control method for controlling a synchronous motor includes calculating d-axis and q-axis current commands according to a frequency command and frequency of the synchronous motor by a MTPA control unit; when a feedback output voltage of the synchronous motor is larger than a control level, outputting a flux-weakening current command by a voltage control unit; calculating a flux-weakening current feed-forward value according to the frequency, a target level and the q-axis current command by a feed-forward control unit; when the sum of the flux-weakening current command and the flux-weakening current feed-forward value is smaller than the d-axis current command, adjusting the d-axis current command by the sum of the flux-weakening current command and the flux-weakening current feed-forward value; and outputting d-axis and q-axis voltage commands according to the adjusted d-axis current command and the q-axis current command to control the synchronous motor.

8 Claims, 5 Drawing Sheets

(56) References Cited

U.S. PATENT DOCUMENTS

| | | | |
|---|---|---|---|
| 2011/0309781 A1* | 12/2011 | Tomigashi | H02P 21/13 318/504 |
| 2013/0009575 A1* | 1/2013 | Yoo | H02P 21/06 318/400.02 |
| 2014/0346983 A1* | 11/2014 | Kato | H02P 21/0089 318/400.02 |

* cited by examiner

SYNCHRONOUS MOTOR CONTROL CIRCUIT AND CONTROL METHOD

RELATED APPLICATIONS

This application claims priority to China Application Serial Number 201610910100.7, filed Oct. 19, 2016, which is herein incorporated by reference.

BACKGROUND

Technical Field

The present disclosure relates to a synchronous motor control method, and in particular, to a synchronous motor control method performing flux-weakening control.

Description of Related Art

The permanent magnet synchronous machine has the energy saving characteristics such as high power density and high machine efficiency. As the increasing consciousness of energy saving, permanent magnet synchronous machines are applied in various device applications to replace the traditional motors.

In the driving control of the permanent magnet synchronous machine, the flux-weakening current may be applied to expand the operating range of the permanent magnet synchronous machine. However, the issues such as insufficient output torque, low operating efficiency occurs when the flux-weakening current is too large. On the other hand, the issues such as the rotation speed unable to be increased or the control unstable occurs, when lacking flux-weakening current. Therefore, an important area of research in the field involves ways in which to improve the flux-weakening control strategy to improve the control stability of the synchronous machines

SUMMARY

One aspect of the present disclosure is a control method for controlling a synchronous motor. The control method includes: calculating, by a MTPA control unit, a first d-axis current command and a q-axis current command according to a frequency command and an electric frequency of the synchronous motor; outputting, by a voltage control unit, a flux-weakening current command when a feedback output voltage of the synchronous motor is larger than a voltage control level; calculating, by a feed-forward control unit, a flux-weakening current feed-forward value according to the electric frequency, a voltage target level and the q-axis current command; adjusting the first d-axis current command by the sum of the flux-weakening current command and the flux-weakening current feed-forward value when the sum of the flux-weakening current command and the flux-weakening current feed-forward value is smaller than the first d-axis current command, in order to output a second d-axis current command; and outputting, by a voltage command output unit, a d-axis voltage command and a q-axis voltage command according to the second d-axis current command and the q-axis current command respectively to control the synchronous motor.

Another aspect of the present disclosure is a synchronous motor control circuit. The synchronous motor control circuit includes: a MTPA control unit, configured to calculate a first d-axis current command and a q-axis current command according to a frequency command and an electric frequency of a synchronous motor; a voltage contra unit, configured to output a flux-weakening current command according to a feedback output voltage of the synchronous motor and a voltage control level; a feed-forward control unit, configured to calculate a flux-weakening current feed-forward value according to the electric frequency, a voltage target level and the q-axis current command; a current command compensating unit, electrically coupled to the MTPA control unit, the voltage control unit and the feed-forward control unit, and configured to adjust the first d-axis current command according to the flux-weakening current command and the flux-weakening current feed-forward value, in order to output a second d-axis current command; and a voltage command output unit, electrically coupled to the current command compensating unit and the MTPA control unit, and configured to output a d-axis voltage command and a q-axis voltage command respectively according to the second d-axis current command and the q-axis current command, to control the synchronous motor.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
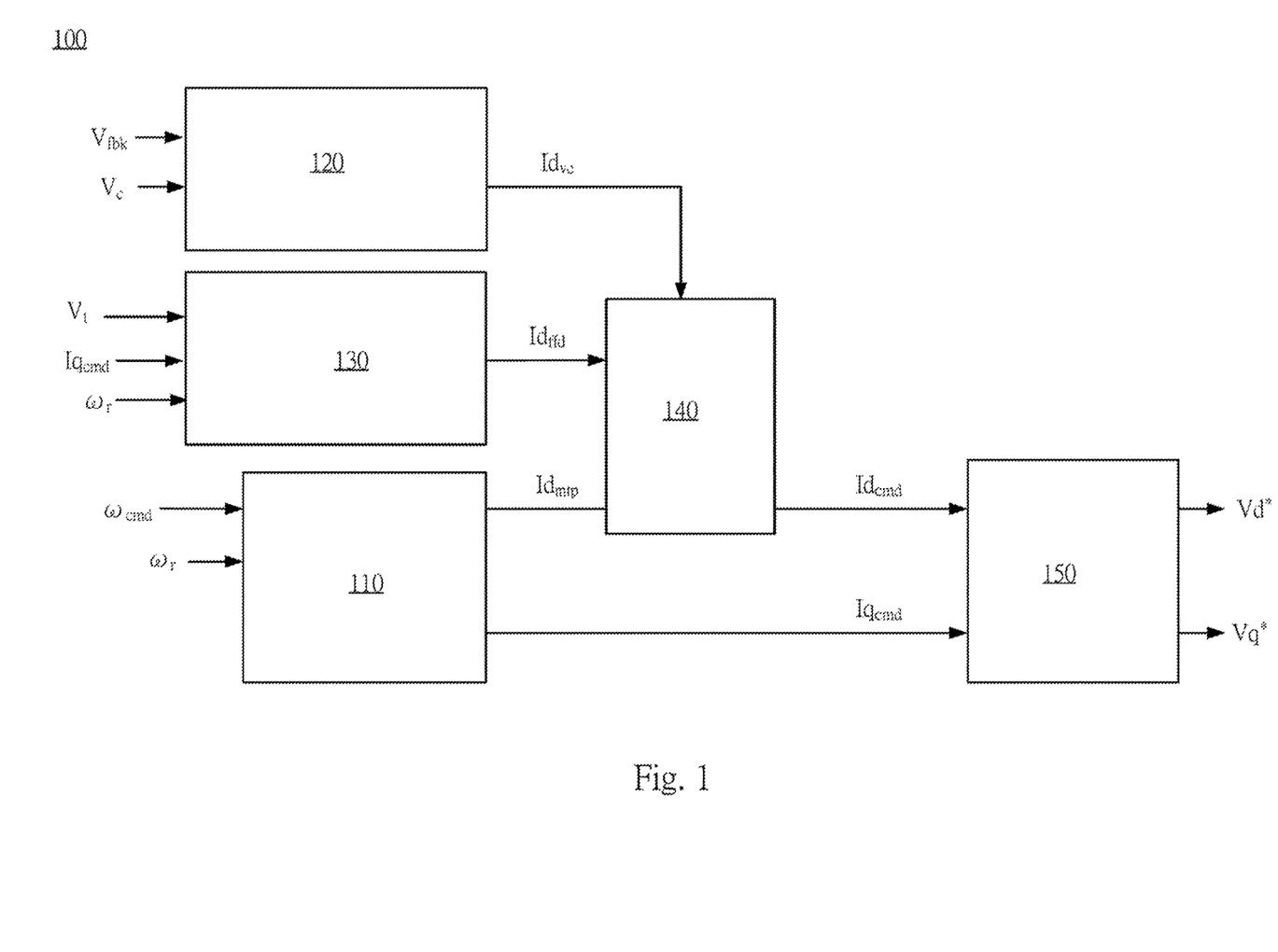
FIG. 1 is a diagram illustrating a synchronous motor control circuit according to some embodiments of the present disclosure.

Reference is made to FIG. 1. FIG. 1 is a diagram illustrating a synchronous motor control circuit 100 according to some embodiments of the present disclosure. In some embodiments, the synchronous motor control circuit 100 may output a d-axis voltage command Vd* and a q-axis voltage command Vq* to control a permanent magnet synchronous motor (PMSM). For example, the d-axis voltage command Vd* and the q-axis voltage command Vq* output by the synchronous motor control circuit 100 may be further converted to three-phase voltage command of the synchronous motor through the inverse Park's Transformation and inverse Clarke Transformation, and then the driving signal (e.g., a pulse width modulation signal, etc.) may be output by the corresponding driving circuit to drive the synchronous motor. Alternatively stated, the synchronous motor control circuit 100 may perform control of the output voltage, output current, the rotation speed, etc. of the synchronous motor by adjusting the output d-axis voltage command Vd* and the q-axis voltage command Vq*.

As depicted in FIG. 1, in some embodiments, the synchronous motor control circuit 100 includes a maximum torque per ampere (MTPA) control unit 110, a voltage control unit 120, a feed-forward control unit 130, a current command compensating unit 140, and a voltage command output unit 150.

Specifically, in some embodiments, the MTPA control unit 110 may calculate the torque required by the synchronous motor according to the frequency command $\omega_{cmd}$ and the electric frequency $\omega_r$ of the synchronous motor, and calculate a first d-axis current command $Id_{mtp}$ and a q-axis current command $Iq_{cmd}$ by the maximum torque per ampere control strategy to provide the maximum torque output to perform the torque control of the synchronous motor.

In some embodiments, as the rotation speed of the synchronous motor or the load increases, the terminal voltage of the synchronous motor increases correspondingly. To avoid output voltage higher than dc bus voltage causing the rotation speed unable to be increased or the control unstable, the synchronous motor control circuit 100 may perform flux-weakening control correspondingly to extend the operation range of the synchronous motor such that the synchronous motor may be operated a hove the rated frequency.

Specifically, the synchronous motor control circuit 100 may calculate the current command required when operated in the flux-weakening control area by the voltage control unit 120, and the feed-forward control unit 130. As depicted in FIG. 1, the voltage control unit 120 is configured to output a flux-weakening current command $Id_{vc}$ according to a feedback output voltage $V_{fbk}$ of the synchronous motor and a voltage control level Vc. For example, in some embodiments, the feedback output voltage $V_{fbk}$ may be calculated by the d-axis voltage command Vd* and the q-axis voltage command Vq*. When the feedback output voltage $V_{fbk}$ is higher than the voltage control level Vc, the voltage control unit 120 outputs the flux-weakening current command $Id_{vc}$.

The feed-forward control unit 130 is configured to calculate a flux-weakening current feed-forward value $Id_{ffd}$ according to the electric frequency $\omega_r$ of the synchronous motor, a voltage target level Vt and the q-axis current command $Iq_{cmd}$. Specifically, the feed-forward control unit 130 calculates the d-axis current of the synchronous motor in the current state based on the reference model of the synchronous rotor. Thus, by adding the flux-weakening current feed-forward value $Id_{ffd}$ and the flux-weakening current command $Id_{vc}$, the current command required in the flux-weakening control area may be obtained. The specific operation of the feed-forward control unit 130 calculating the flux-weakening current feed-forward value $Id_{ffd}$ will be discussed in detailed in accompanied with the drawings in the following paragraphs.

In some embodiments, the synchronous motor control circuit 100 may determine whether the synchronous motor is operated in the MTPA control area or the flux-weakening control area by the current command compensating unit 140. The current command compensating unit 140 is electrically coupled to the MTPA control unit 110, the voltage control unit 120, and the feed-forward control unit 130. The current command compensating unit 140 is configured to adjust the first d-axis current command $Id_{mtp}$ according to the flux-weakening current command $Id_{vc}$ and the flux-weakening current feed-forward value $Id_{ffd}$. Thus, the current command compensating unit 140 may output an adjusted second d-axis current command $Id_{cmd}$. Therefore, the second d-axis current command $Id_{cmd}$ and the q-axis current command $Iq_{cmd}$ may be output to the voltage command output unit 150.

Alternatively stated, the MTPA control unit 110, the voltage control unit 120, the feed-forward control unit 130 and the current command compensating unit 140 form a current command output unit, and configured to selectively output the second d-axis current command $Id_{cmd}$ and the q-axis current command $Iq_{cmd}$ in co-operation according to the operation state of the synchronous motor. Under the MTPA control, the second d-axis current command $Id_{cmd}$ and the q-axis current command $Iq_{cmd}$ may be the current command for providing the maximum torque per ampere. On the other hand under the flux-weakening control, the second d-axis current command $Id_{cmd}$ is corrected based on the flux-weakening current feed-forward value $Id_{ffd}$ and the flux-weakening current command $Id_{vc}$, so as to restrain the increase of the output voltage of the synchronous motor. Accordingly, the synchronous motor may be operated above the rated frequency.

The voltage command output unit 150 is electrically coupled to the current command compensating unit 140 and the MTPA control unit 110. The voltage command output unit 150 is configured to output the d-axis voltage command Vd* and the q-axis voltage command Vq* respectively according to the second d-axis current command $Id_{cmd}$ and the q-axis current command $Iq_{cmd}$, to drive the synchronous motor.

Accordingly, by the co-operation of the circuit units mentioned above, the synchronous motor control circuit 100 may output the d-axis voltage command Vd* and the q-axis voltage command Vq* to control the synchronous motor, and generate corresponding current command when a flux-weakening control is desired.

Figure 2:
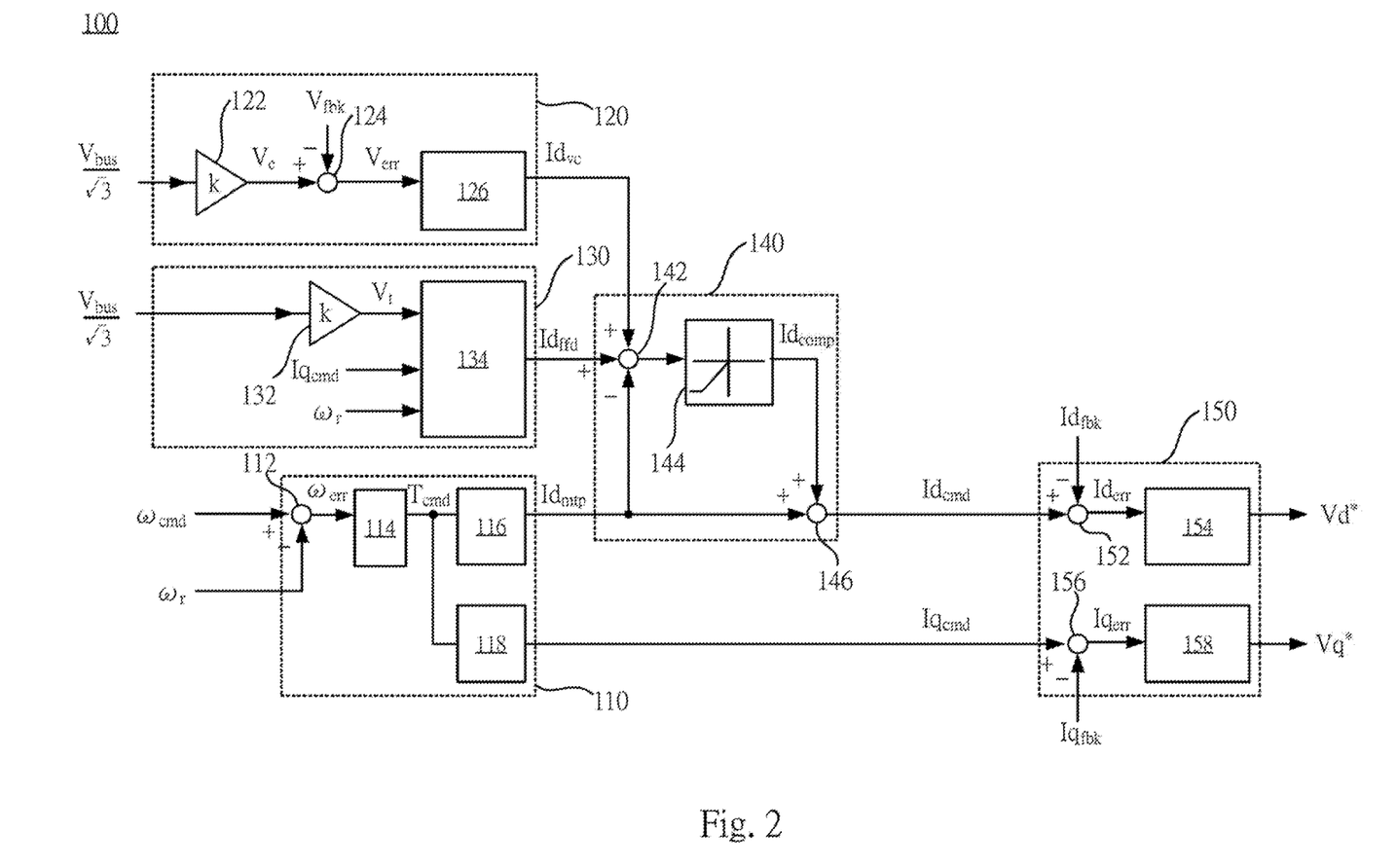
FIG. 2 is a diagram illustrating the synchronous motor control circuit according to some embodiments of the present disclosure.

For the convenience of the explanation, in the following paragraph, the implementation of the function units in the synchronous motor control circuit 100 will be discussed in detail with the embodiment in accompanied with the drawings. Reference is made to FIG. 2. FIG. 2 is a diagram illustrating the synchronous motor control circuit 100 according to some embodiments of the present disclosure.

As depicted in FIG. 2, in some embodiments, the PTA control unit 110 includes a calculating unit 112, a speed controller 114, a d-axis current command calculation unit 116 and a q-axis current command calculation unit 118. For example, the calculating unit 112 may include a subtractor configured to calculate the frequency error value $\omega_{err}$ between the frequency command $\omega_{cmd}$ and the electric frequency $\omega_r$. The speed controller 114 may receive the frequency error value $\omega_{err}$ and calculate and output the torque command $T_{cmd}$ correspondingly. Thus, the d-axis current command calculation unit 116 and the q-axis current command calculation unit 118 may output the first d-axis current command $Id_{mtp}$ and the q-axis current command $Iq_{cmd}$ based on the maximum torque per ampere control strategy.

In addition, in some embodiments, the voltage control unit 120 includes a proportional controller 122, a calculating unit 124 and a voltage controller 126. The proportional controller 122 is configured to receive the dc bus voltage Vbus and output the voltage control level Vc. The calculating unit 124 is configured to calculate the difference between the voltage control level Vc and the feedback output voltage $V_{fbk}$ (i.e., the voltage error value $V_{err}$) to determine whether the feedback output voltage $V_{fbk}$ is larger than the voltage control level Vc. By such operation, the voltage controller 126 may output the corresponding flux-weakening current command $Id_{vc}$ according to the difference between the voltage control level Vc and the feedback output voltage $V_{fbk}$ (i.e., the voltage error value $V_{err}$) to control the output voltage of the synchronous motor.

In addition, in some embodiments, the feed-forward control unit 130 includes a proportional controller 132 and a reference model 134. Similar to the proportional controller 122 in the voltage control unit 120, the proportional controller 132 may also be configured to receive the dc bus voltage Vbus—and output the voltage target level Vt.

The reference model 134 in the feed-forward control unit 130 is obtained according to the flux linkage parameter of the synchronous motor. Accordingly, the feed-forward control unit 130 may calculate the flux-weakening current feed-forward value $Id_{ffd}$ according to the electric frequency $\omega_r$ of the synchronous motor, the voltage target level Vt and the present q-axis current command $Iq_{cmd}$ based on the reference model 134.

Specifically, in some embodiments, based on the set of the voltage equations of the synchronously rotating reference frame in the steady state model, the flux-weakening current feed-forward value $Id_{ffd}$ may be expressed as:

$$Id_{ffd} = \frac{1}{\omega_r L_d}\left[-\omega_r \phi_f + \sqrt{V_{smax}^2 - (\omega_r L_q I_q)^2}\right]$$

In which $\omega_r$ denotes the electric frequency, $\phi_f$ denotes the flux linkage parameter of the synchronous motor, $V_{smax}$ denotes the phase voltage maximum, $L_d$ denotes the d-axis inductance, and $L_q$ denotes the q-axis inductance. Alternatively stated, under the circumstance that the related inductance parameters and flux linkage parameters of the synchronous motor are given, the corresponding flux-weakening current feed-forward value $Id_{ffd}$ may be calculated by substituting the voltage target level Vt corresponding to the phase voltage maximum $V_{smax}$ and the electric frequency $\omega_r$ into the reference model 134. Accordingly, in the present disclosure, by combing the flux-weakening current command $Id_{vc}$ output by the voltage controller 126 in the voltage control unit 120 and the corresponding flux-weakening current feed-forward value $Id_{ffd}$ output by the reference model 134 in the feed-forward control unit 130, the flux-weakening control may be more precise, the error is the steady state may be reduced, and the system characteristic of the synchronous motor in the steady state may be satisfied.

In some embodiments, the current command compensating unit 140 includes a calculating unit 142, a limiting unit 144 and a calculating unit 146. As depicted in the drawing, the calculating unit 142 may receive the flux-weakening current command $Id_{vc}$, the flux-weakening current feed-forward value $Id_{ffd}$, the first d-axis current command $Id_{mtp}$ output by the MTPA control unit 110, and calculate the difference between the sum of the flux-weakening current command $Id_{vc}$ and the flux-weakening rent feed-forward value $Id_{ffd}$, and the first d-axis current command $Id_{mtp}$, to obtain a flux-weakening current compensating value.

The limiting unit 144 may receive the flux-weakening current compensating value output by the calculating unit 142 and execute a limitation to the flux-weakening current compensating value. Specifically, in some embodiments, when the flux-weakening current compensating value is larger than zero, the flux weakening current compensating value $Id_{comp}$ output by the limiting unit 144 is zero. Alternatively stated, when the flux-weakening current compensating value is positive, the current command compensating unit 140 may determine that it is not required to adjust the first d-axis current command $Id_{mtp}$ output by the MTPA control unit 110, and thus the current command is output when maintaining the MPTA control strategy. On the other hand, when the flux-weakening current compensating value is negative, the current command compensating unit 140 may determine that the flux-weakening control is required, and output the flux-weakening current compensating value $Id_{comp}$ to compensate the first d-axis current command $Id_{mtp}$ to switch to the flux-weakening current operating region.

Therefore, the calculating unit 146 may add up the flux-weakening current compensating value $Id_{comp}$ and the first d-axis current command $Id_{mtp}$ to obtain a second d-axis current command $Id_{cmd}$ to achieve correcting the previous first d-axis current command $Id_{mtp}$ according to the limited flux-weakening current compensating value $Id_{comp}$.

In some embodiments, the voltage command output unit 150 includes a calculating unit 152, a d-axis current controller 154, a calculating unit 156, and a q-axis current controller 158. The calculating unit 152 may calculate a d-axis current error value $Id_{err}$ according to the second d-axis current command $Id_{cmd}$ and a d-axis feedback current $Id_{fbk}$ of the synchronous motor. Thus, the d-axis current controller 154 may output the corresponding d-axis voltage command Vd* according to the d-axis current error value $Id_{err}$. Similarly, the calculating unit 156 may calculate a q-axis current error value $Iq_{err}$ according to the q-axis current command $Iq_{cmd}$ and a q-axis feedback current $Iq_{fbk}$ of the synchronous motor. Thus, the q-axis current controller 158 may output the corresponding q-axis voltage command Vq* according to the q-axis current error value $Iq_{err}$.

Figure 3:
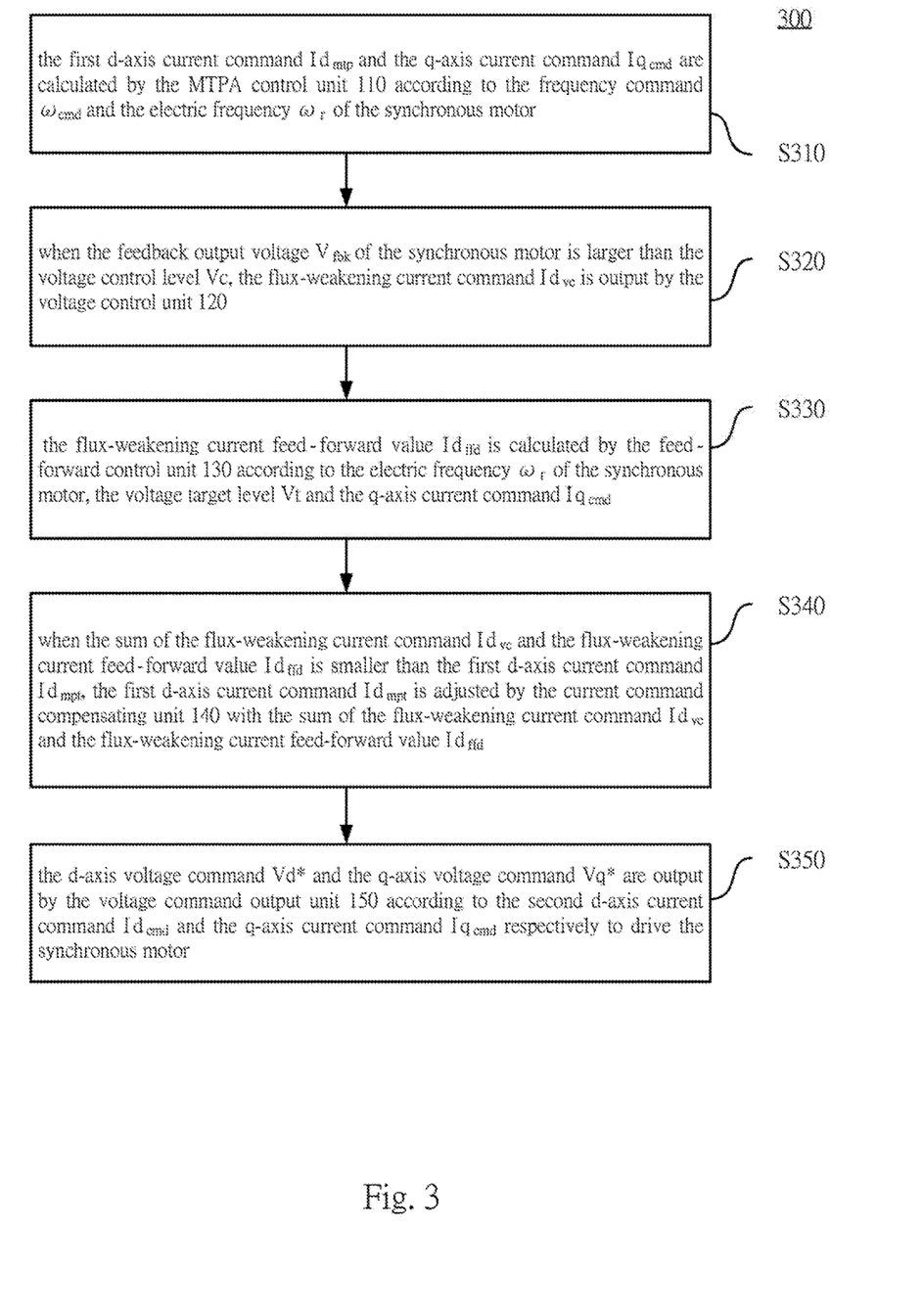
FIG. 3 is a flow chart illustrating a control method according to some embodiments of the present disclosure.

Reference is made to FIG. 3. FIG. 3 is a flow chart illustrating a control method 300 according to some embodiments of the present disclosure. The control method 300 may be used in controlling a synchronous motor. For better understanding of the present disclosure, the control method 300 is discussed in relation to the embodiments shown in FIG. 1 and FIG. 2, but is not limited thereto. As depicted in FIG. 3, the control method 300 includes steps S310, S320, S330, S340 and S350.

First, in the step S310, the first d-axis current command $Id_{mtp}$ and the q-axis current command $Iq_{cmd}$ are calculated by the MTPA control unit 110 according to the frequency command $\omega_{cmd}$ and the electric frequency $\omega_r$ of the synchronous motor.

Next, in the step S320, when the feedback output voltage $V_{fbk}$ of the synchronous motor is larger than the voltage control level Vc, the flux-weakening current command $Id_{vc}$ is output by the voltage control unit 120. In some embodiments, in the step S320, the dc bus voltage Vbus is received by the proportional controller 122 in the voltage control unit 120, to output the voltage control level Vc.

Next, in the step S330, the flux-weakening current feed-forward value $Id_{ffd}$ is calculated by the feed-forward control unit 130 according to the electric frequency $\omega_r$ of the synchronous motor, the voltage target level Vt and the q-axis current command $Iq_{cmd}$. In some embodiments, in the step S320, the dc bus voltage Vbus is received by the proportional controller 132 in the feed-forward control unit 130, to output the voltage target level Vt.

Specifically, the step S330 includes obtaining the reference model 134 according to the flux linkage parameter of the synchronous motor; and calculating the flux-weakening current feed-forward value $Id_{ffd}$ according to the electric frequency $\omega_r$ of the synchronous motor, the voltage target level Vt and the q-axis current command $Iq_{cmd}$ based on the reference model 134.

Next, in the step S340, when the sum of the flux-weakening current command $Id_{vc}$ and the flux-weakening current feed-forward value $Id_{ffd}$ is smaller than the first d-axis current command $Id_{mpt}$, the first d-axis current command $Id_{mpt}$ is adjusted by the current command compensating unit 140 with the sum of the flux-weakening current command $Id_{vc}$ and the flux-weakening current feed-forward value $Id_{ffd}$.

Specifically, the step of adjusting the first d-axis current command $Id_{mpt}$ by the current command compensating unit 140 includes: calculating, by the calculating unit 142, the difference between the sum of the flux-weakening current command $Id_{vc}$ and the flux-weakening current feed-forward value $Id_{ffd}$, and the first d-axis current command $Id_{mtp}$, to obtain the flux-weakening current compensating value; executing, by the limiting unit 144, a limitation to the flux-weakening current compensating value, in which when the flux-weakening current compensating value is larger than zero, the flux-weakening current compensating value $Id_{comp}$ output by the limiting unit 144 is zero; and correcting, by the calculating unit 146, the first d-axis current command $Id_{mtp}$ to output the second d-axis current command $Id_{cmd}$ according to the limited flux-weakening current compensating value $Id_{comp}$.

Finally, in the step S350, the d-axis voltage command Vd* and the q-axis voltage command Vq* are output by the voltage command output unit 150 according to the second d-axis current command $Id_{cmd}$ and the q-axis current command $Iq_{cmd}$ respectively to drive the synchronous motor.

Specifically, the step S530 further includes: calculating, by the calculating unit 152, the d-axis current error value $Id_{err}$ according to the second d-axis current command $Id_{cmd}$ and the d-axis feedback current $Id_{fbk}$ of the synchronous motor. Next, outputting, by the d-axis current controller 154, the d-axis voltage command Vd* according to the d-axis current error value $Id_{err}$. Next, calculating, by the calculating unit 156, the q-axis current error value $Iq_{err}$ according to the q-axis current command $Iq_{cmd}$ and the q-axis feedback current $Iq_{fbk}$ of the synchronous motor. Finally, outputting, by the q-axis current controller 158, the q-axis voltage command Vq* according to the q-axis current error value $Iq_{err}$.

Those skilled in the art can immediately understand how to perform the operations and functions of the control method 300 based on the synchronous motor control circuit 100 in the various embodiments described above, and thus a further explanation is omitted herein for the sake of brevity.

Figure 4:
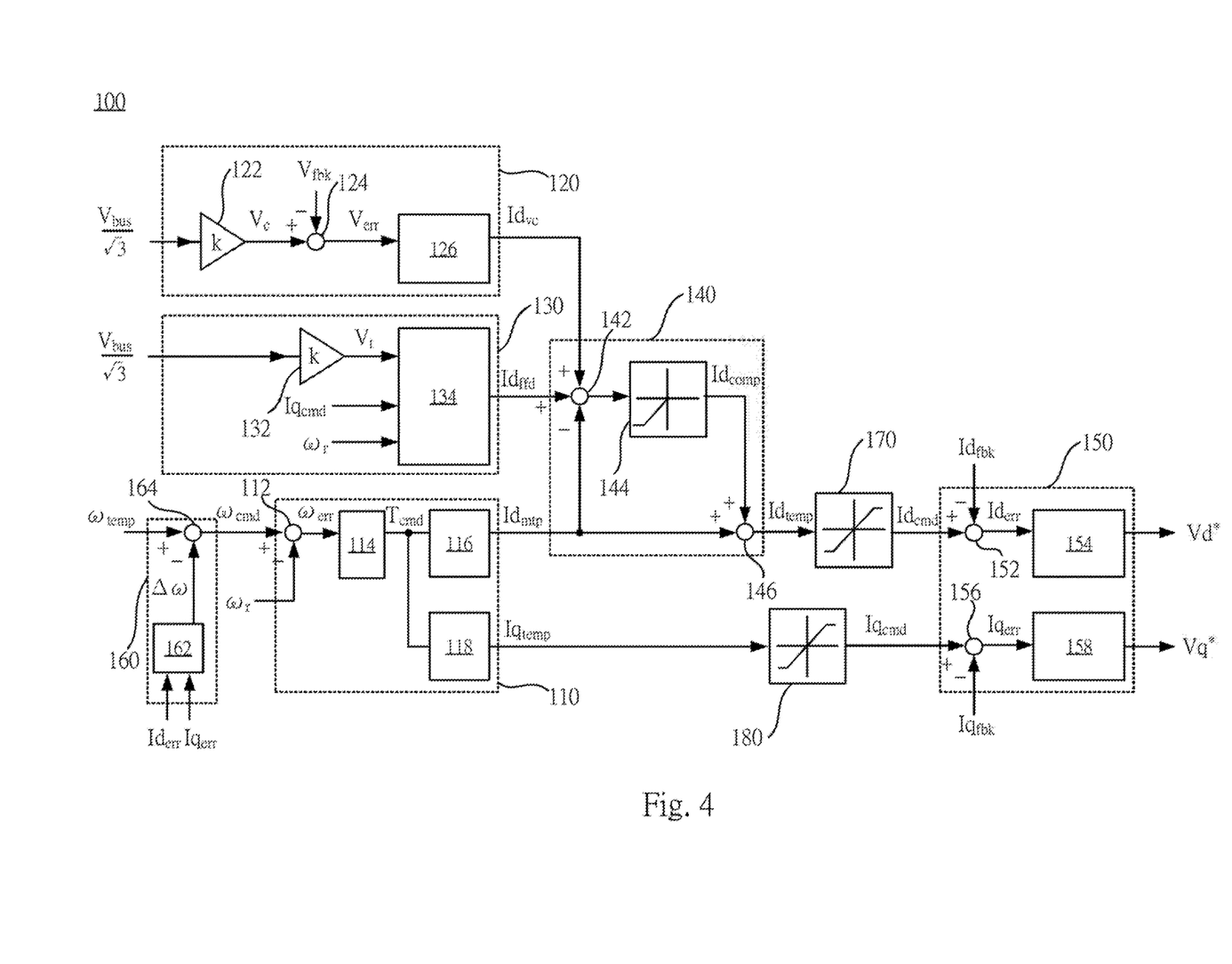
FIG. 4 is a diagram illustrating the synchronous motor control circuit according to some other embodiments of the present disclosure.

Reference is made to FIG. 4. FIG. 4 is a diagram illustrating the synchronous motor control circuit 100 according to some other embodiments of the present disclosure. With respect to the embodiments of FIG. 1 and FIG. 2, like elements in FIG. 4 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 4.

As depicted in FIG. 4 in some embodiments, the synchronous motor control circuit 100 further includes a voltage saturation adjusting unit 160 configured to adjust the frequency command $\omega_{cmd}$ output to the MTPA control unit 110 when the the output voltage of the driving circuit is greater than the voltage limitations. Specifically, the voltage saturation adjusting unit 160 includes a voltage saturation adjuster 162 and a frequency command calculating unit 164. The voltage saturation adjuster 162 is configured to calculate a frequency command correction value Δω according to the difference between the second d-axis current command $Id_{cmd}$ and the d-axis feedback current $Id_{fbk}$ (i.e., the d-axis current error value $Id_{err}$), and the difference between the q-axis current command $Iq_{cmd}$ and the q-axis feedback current $Iq_{fbk}$ (i.e., the q-axis current error value $Iq_{err}$). The frequency command calculating unit 164 is electrically coupled to the voltage saturation adjuster 162 and is configured to adjust the previous frequency command $\omega_{temp}$ according to the frequency command correction value Δω, so as to output a new frequency command $\omega_{cmd}$ to the MTPA control unit 110.

Thus, during the transient state when the output voltage saturates, the synchronous motor control circuit 100 may adjust the frequency command $\omega_{cmd}$ in real-time by the voltage saturation adjusting unit 160 to reduce the saturation effect. Accordingly, when the synchronous motor control circuit 100 controls the synchronous motor to be switched to the flux-weakening operation region, the stability during the transient may be improved effectively to ensure the proper operation of the control devices including the speed controller 114, the d-axis current controller 154, the q-axis current controller 158, etc., avoiding the malfunction such as loss of speed or over-current.

In addition, as depicted in FIG. 4, in some embodiments, the synchronous motor control circuit 100 further includes limiting units 170 and 180. The limiting unit 170 is electrically coupled between the current command compensating unit 140 and the voltage command output unit 150, and the limiting unit 180 is electrically coupled between the MTPA control unit 110 and the voltage command output unit 150. In the embodiment depicted in FIG. 4, compared to the embodiment depicted in FIG. 2, the adjusted d-axis current command $Id_{temp}$ output by the current command compensating unit 140 and the q-axis current command $Iq_{temp}$ output by the MTPA control unit 110 will be limited by the limiting unit 170 and the limiting unit 180 respectively to avoid the abnormal operation or incidents occurs due to the excessive current command received by the voltage command output unit 150. The limiting unit 170 and the limiting unit 180 respectively limit the d-axis current command $Id_{temp}$ and the q-axis current command $Iq_{temp}$, and then output the new second d-axis current command $Id_{cmd}$ and the q-axis current command $Iq_{cmd}$ to the voltage command output unit 150 for later control and calculation.

Figure 5:
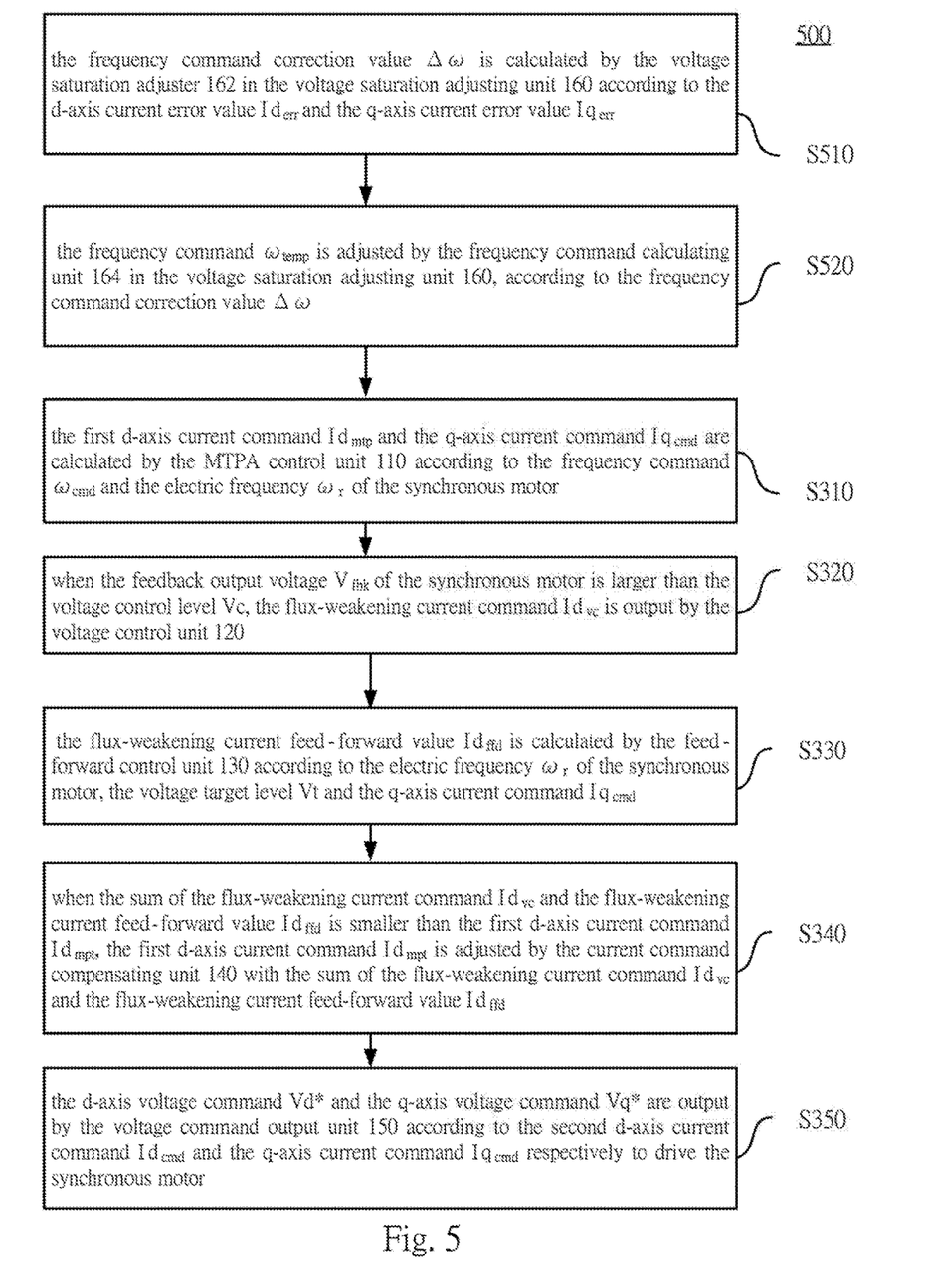
FIG. 5 is a flow chart illustrating a control method according to some embodiments of the present disclosure.

Reference is made to FIG. 5. FIG. 5 is a flow chart illustrating a control method 500 according to some embodiments of the present disclosure. For better understanding of the present disclosure, the control method 500 is discussed in relation to the embodiments shown in FIG. 4, but is not limited thereto. As depicted in FIG. 5, compared to the control method 300 shown in FIG. 3, the control method 500 shown in FIG. 5 further includes steps S510 and S520.

First, in the step S510, the frequency command correction value Δω is calculated by the voltage saturation adjuster 162 in the voltage saturation adjusting unit 160 according to the d-axis current error value $Id_{err}$ and the q-axis current error value $Iq_{err}$. Specifically, the d-axis current error value $Id_{err}$ is the difference between the second d-axis current command $Id_{cmd}$ and the d-axis feedback current $Id_{fbk}$, and the q-axis current error value $Iq_{err}$ is the difference between the q-axis current command $Iq_{cmd}$ and the q-axis feedback current $Iq_{fbk}$.

Next, in the step S520, the frequency command $\omega_{temp}$ is adjusted by the frequency command calculating unit 164 in the voltage saturation adjusting unit 160, according to the frequency command correction value Δω.

The remaining steps S310-S350 in the control method 500 are similar to the embodiments shown in FIG. 3, which are discussed in detail the above paragraphs and thus further explanation is omitted herein for the sake of brevity. Those skilled in the art can immediately understand how to perform the operations and functions of the control method 500 based on the synchronous motor control circuit 100 in the various embodiments described above, and thus a further explanation is omitted herein for the sake of brevity.

In summary, by applying various embodiments in the present disclosure, the synchronous motor control circuit in the present disclosure may provide flux-weakening current by combining the voltage control unit and the feed-forward control of the motor reference model, and give consideration to both the fast response of the controller and the stable operation. In addition, in some embodiments, by adding the voltage saturation adjusting unit, the frequency command may be adjusted in real-time under the circumstances such as the varying d-axis and q-axis inductances, the changing flux, or the rapidly changing loads, so as to reduce the saturation of the voltage or current and improve the transient stability.

In addition, in the above embodiments, the circuit units may be implemented by various digital or analog circuits, and may also be implemented by various integrated circuit chips. Each elements may also be integrated in a single digital control chip, or be implemented by a microcontroller unit (MCU), a Complex Programmable Logic Device (CPLD), a Field-programmable gate array (FPGA), or other processor or IC chips. The devices mentioned above are merely examples and not meant to limit the present disclosure.

What is claimed is:

1. A control method for controlling a synchronous motor, comprising:
   calculating, by a MTPA control unit, a first d-axis current command and a q-axis current command according to a frequency command and an electric frequency of the synchronous motor;
   outputting, by a voltage control unit, a flux-weakening current command when a feedback output voltage of the synchronous motor is larger than a voltage control level;
   calculating, by a feed-forward control unit, a flux-weakening current feed-forward value according to the electric frequency, a voltage target level and the q-axis current command;
   adjusting the first d-axis current command by the sum of the flux-weakening current command and the flux-weakening current feed-forward value when the sum of the flux-weakening current command and the flux-weakening current feed-forward value is smaller than the first d-axis current command, in order to output a second d-axis current command; and
   outputting, by a voltage command output unit, a d-axis voltage command and a q-axis voltage command according to the second d-axis current command and the q-axis current command respectively to control the synchronous motor;
   wherein calculating the flux-weakening current feed-forward value by the feed-forward control unit comprises:
   obtaining a reference model according to a flux linkage parameter of the synchronous motor; and
   calculating the flux-weakening current feed-forward value according to the electric frequency, the voltage target level and the q-axis current command based on the reference model.

2. The control method of claim 1, further comprising:
   calculating, by a voltage saturation adjusting unit, a frequency command correction value according to a d-axis current error value and a q-axis current error value, wherein the d-axis current error value is the difference between the second d-axis current command and a d-axis feedback current, and the q-axis current error value is the difference between the q-axis current command and a q-axis feedback current; and
   adjusting, by the voltage saturation adjusting unit, the frequency command according to the frequency command correction value.

3. The control method of claim 1, further comprising:
   calculating, by a first calculating unit, the difference between the sum of the flux-weakening current command and the flux-weakening current feed-forward value, and the first d-axis current command, to obtain a flux-weakening current compensating value;
   executing, by a limiting unit, a limitation to the flux-weakening current compensating value, wherein when the flux-weakening current compensating value is larger than zero, the flux-weakening current compensating value output by the limiting unit is zero; and
   correcting, by a second calculating unit, the first d-axis current command to output the second d-axis current command according to the limited flux-weakening current compensating value.

4. The control method of claim 1, wherein outputting the d-axis voltage command and the q-axis voltage command by the voltage command output unit comprises:
   calculating, by a third calculating unit, a d-axis current error value according to the second d-axis current command and a d-axis feedback current of the synchronous motor;
   outputting, by a d-axis current controller of the voltage command output unit, the d-axis voltage command according to the d-axis current error value;
   calculating, by a fourth calculating unit, a q-axis current error value according to the q-axis current command and a q-axis feedback current of the synchronous motor; and
   outputting, by a q-axis current controller of the voltage command output unit, the q-axis voltage command according to the q-axis current error value.

5. The control method of claim 1, further comprising:
   receiving, by a first proportional controller in the voltage control unit, a dc bus voltage to output the voltage control level; and
   receiving, by a second proportional controller in the feed-forward control unit, the dc bus voltage to output the voltage target level.

6. A synchronous motor control circuit, comprising:
   a MTPA control unit, configured to calculate a first d-axis current command and a q-axis current command according to a frequency command and an electric frequency of a synchronous motor;
   a voltage control unit, configured to output a flux-weakening current command according to a feedback output voltage of the synchronous motor and a voltage control level;
   a feed-forward control unit, configured to calculate a flux-weakening current feed-forward value according to the electric frequency, a voltage target level and the q-axis current command;
   a current command compensating unit, electrically coupled to the MTPA control unit, the voltage control unit and the feed-forward control unit, and configured to adjust the first d-axis current command according to the flux-weakening current command and the flux-weakening current feed-forward value, in order to output a second d-axis current command; and
   a voltage command output unit, electrically coupled to the current command compensating unit and the MTPA control unit, and configured to output a d-axis voltage command and a q-axis voltage command respectively according to the second d-axis current command and the q-axis current command, to control the synchronous motor;

wherein the feed-forward control unit comprises a reference model obtained according to a flux linkage parameter of the synchronous motor, and the feed-forward control unit calculates the flux-weakening current feed-forward value based on the reference model.

7. The synchronous motor control circuit of claim 6, further comprising: a voltage saturation adjusting unit, wherein the voltage saturation adjusting unit comprises:
   a voltage saturation adjuster configured to calculate a frequency command correction value according to the difference between the second d-axis current command and a d-axis feedback current, and the difference between the q-axis current command and a q-axis feedback current; and
   a frequency command calculating unit, configured to adjust the frequency command according to the frequency command correction value.

8. The synchronous motor control circuit of claim 6, wherein the current command compensating unit comprises:
   a first calculating unit, configured to calculate the difference between the sum of the flux-weakening current command and the flux-weakening current feed-forward value, and the first d-axis current command, to obtain a flux-weakening current compensating value;
   a limiting unit, configured to execute a limitation to the flux-weakening current compensating value, wherein when the flux-weakening current compensating value is larger than zero, the flux-weakening current compensating value output by the limiting unit is zero; and
   a second calculating unit, configured to correct the first d-axis current command output by the MTPA control unit according to the flux-weakening current compensating value output by the limiting unit, in order to output the second d-axis current command.

* * * * *